(12) United States Patent
Laymaster

(10) Patent No.: US 8,141,669 B1
(45) Date of Patent: Mar. 27, 2012

(54) MOTORIZED PERSONAL TRANSPORTER

(76) Inventor: Larry A. Laymaster, Xenia, OH (US)

( * ) Notice: Subject to any disclaimer, the term of this patent is extended or adjusted under 35 U.S.C. 154(b) by 485 days.

(21) Appl. No.: 12/378,265

(22) Filed: Feb. 12, 2009

(51) Int. Cl.
*B60K 1/00* (2006.01)
(52) U.S. Cl. ........................ 180/65.6; 180/216
(58) Field of Classification Search ................ 180/65.1, 180/65.51, 65.6, 215, 216, 217, 65.31, 907, 180/908
See application file for complete search history.

(56) References Cited

U.S. PATENT DOCUMENTS

| | | | | |
|---|---|---|---|---|
| 3,512,599 A | * | 5/1970 | Haddix et al. | 180/217 |
| 3,802,524 A | * | 4/1974 | Seidel | 180/6.5 |
| 3,872,945 A | * | 3/1975 | Hickman et al. | 180/65.6 |
| 3,901,337 A | * | 8/1975 | Cragg | 180/6.5 |
| 3,930,551 A | * | 1/1976 | Cragg | 180/65.6 |
| 3,955,639 A | * | 5/1976 | Cragg | 180/6.5 |
| 4,106,583 A | * | 8/1978 | Nemeth | 180/65.6 |
| 4,119,164 A | * | 10/1978 | Fogg et al. | 180/6.5 |
| 4,390,076 A | | 6/1983 | Wier et al. | |
| 4,415,049 A | | 11/1983 | Wereb | |
| 4,573,549 A | * | 3/1986 | Pankow | 180/216 |
| 5,366,036 A | | 11/1994 | Perry | |
| 5,894,898 A | | 4/1999 | Catto | |
| 6,125,957 A | * | 10/2000 | Kauffmann | 180/65.1 |
| 6,267,190 B1 | * | 7/2001 | Micheletti | 180/183 |
| 6,302,230 B1 | | 10/2001 | Kamen et al. | |
| 6,371,228 B1 | * | 4/2002 | Husted et al. | 180/65.1 |
| 6,796,396 B2 | | 9/2004 | Kamen et al. | |
| 7,174,976 B2 | | 2/2007 | Kamen et al. | |

OTHER PUBLICATIONS

Zappy 3 Pro Electric Scooter, 1 page, date unknown.

\* cited by examiner

*Primary Examiner* — J. Allen Shriver, II
*Assistant Examiner* — Bridget Avery
(74) *Attorney, Agent, or Firm* — Jacox, Meckstroth & Jenkins

(57) ABSTRACT

A personal transporter includes a tubular metal frame supporting a platform for supporting an operator, and the frame has forwardly projecting and parallel spaced inverted L-shaped frame members which support a pair of freely rotating front caster wheels. A pair of reversible electric motor and attached gearbox drive units are mounted on the rear portion of the frame on opposite sides of the platform, and the gearboxes have right angle output shafts forming axles supporting a pair of rear wheels. A storage battery is enclosed within a box in front of the platform, and a vertical adjustable post projects upwardly in front of the box to support a handlebar. A hand control unit is mounted on the handlebar and is connected to the drive units through a control system within the box. The rear wheels are covered by fender guards which also cover the drive units.

2 Claims, 2 Drawing Sheets

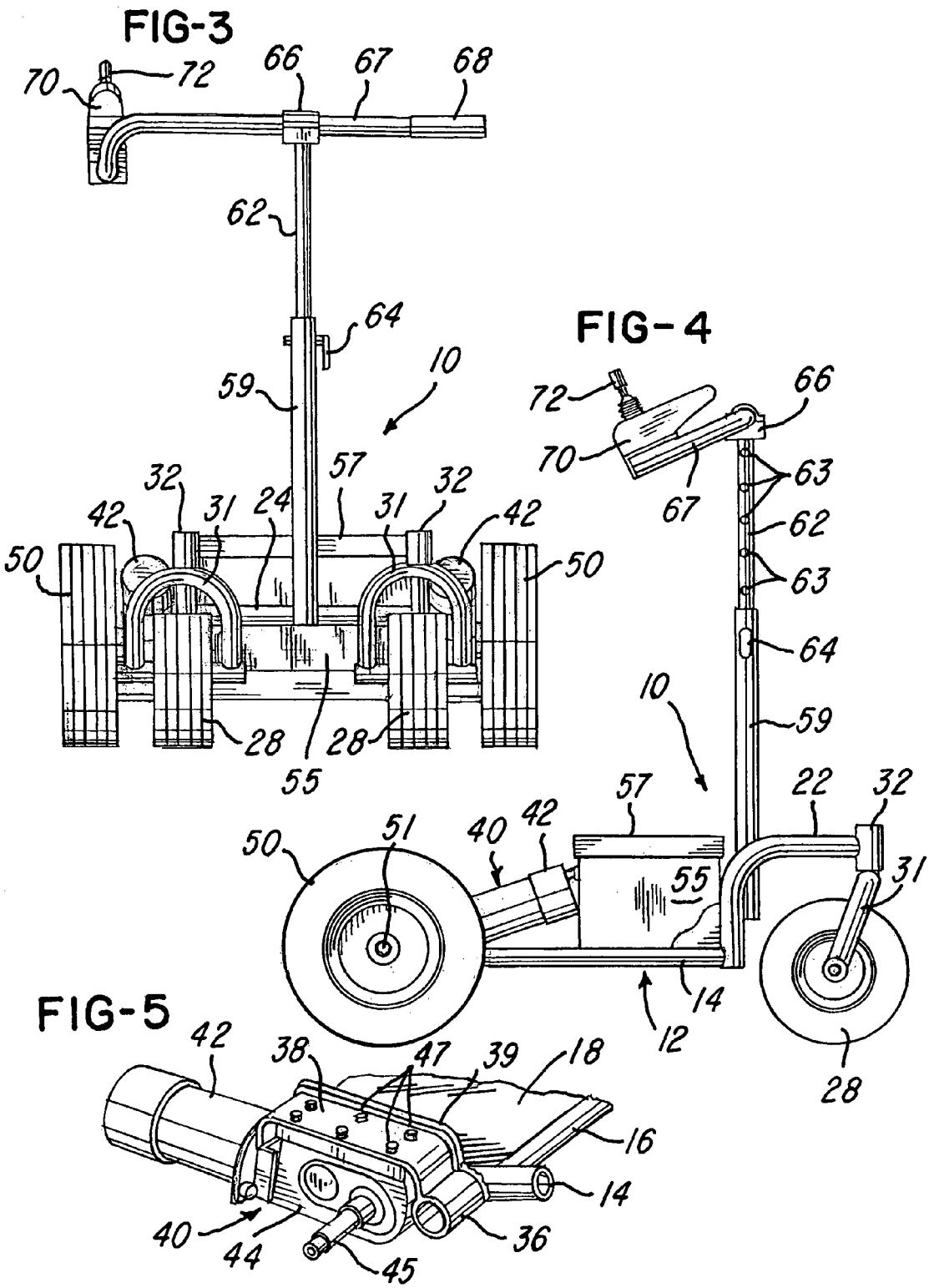

MOTORIZED PERSONAL TRANSPORTER

BACKGROUND OF THE INVENTION

This invention relates to motorized personal transporters or scooters for transporting a standing person and which have two rear wheels and one or two front wheels, for example, as disclosed in U.S. Pat. No. 4,390,076 and No. 5,366,036 and an electric scooter produced by ZAP and sold under the trademark "The ZAPPY 3 PRO". As shown in the above patents, the transporters may also be constructed to move a person from a seated or wheelchair position to a standing position and are intended for use by handicapped people. There are also motor driven personal transporters for a stand-up operator and controlled by leaning movement of the operator, for example, as disclosed in numerous U.S. patents of Dean L. Kamen, including U.S. Pat. No. 6,302,230, No. 6,796,396 and No. 7,174,976, and sold under the trademark SEGWAY. Also well known are motor driven wheelchairs as disclosed in many U.S. patents, for example, U.S. Pat. No. 4,415,049, and three wheeled motor driven scooters having a steerable front wheel and driven rear wheels, for example, as disclosed in U.S. Pat. No. 5,894,898.

SUMMARY OF THE INVENTION

The present invention is directed to a motorized transporter for a standing person and which provides for a rear entry, is simple and easy to use, and has a tight turning radius as well as being stable and durable so that any walking person may quickly step on to the transporter and move in any direction at relative quick speeds without significant training. The above features are also provided by a transporter structure which has a low vertical height or profile, a low center of gravity, and may be conveniently transported in a space such as the trunk compartment of a motor vehicle.

In accordance with one embodiment of the invention, a motor operated personal transporter having the above features is provided by a tubular frame supporting a low horizontal platform for a standing operator, and the frame has forwardly projecting parallel spaced frame members which support a pair of freely rotating front caster wheels. A pair of drive units each include a reversible electric motor coupled to a gearbox having a right angle output shaft and are mounted on the rear portion of the frame on opposite sides of the platform, and the output shafts of the gearboxes form laterally projecting axles receiving a pair of rear wheels. A set of storage batteries are enclosed within a battery box at the front of the platform, and a vertical adjustable and removable post projects upwardly in front of the box to support a handlebar on which is mounted on a hand operated control unit. The control unit is connected to the batteries and the electric motors through a control system enclosed within the battery box, and the motor-gearbox drive units are covered by corresponding fender guards which also cover the rear wheels.

Other features and advantages of the invention will be apparent from the following description, the accompanying drawings and the appended claims.

BRIEF DESCRIPTION OF THE DRAWINGS

FIG. 3 is a front view of the transporter shown in FIGS. 1 & 2 and without the fender guards which cover the rear tires and drive units;

FIG. 4 is a side view of the transporter shown in FIG. 3; and

FIG. 5 is a fragmentary perspective view showing the left drive unit and its support for the left rear wheel.

DESCRIPTION OF THE ILLUSTRATED EMBODIMENT

Figure 1:
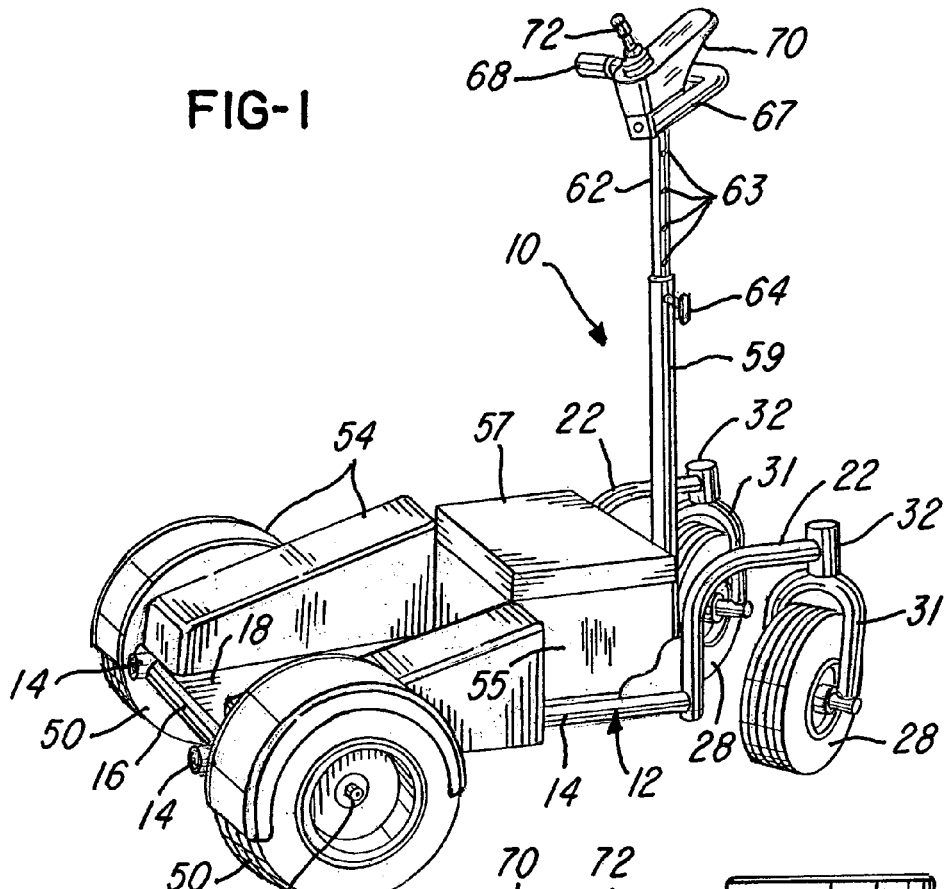
FIG. 1 is a perspective view of a motorized personal transporter constructed in accordance with the invention.

Referring to FIGS. 1-4, a motorized personal transporter 10 includes a tubular frame 12 formed by a pair parallel spaced horizontal tubular metal or steel frame members 14 rigidly connected by a set of welded cross tubular metal frame members 16. The frame 12 supports a flat horizontal platform 18 attached or welded to the cross frame members. The forward portion of the frame 12 includes a pair of parallel spaced inverted L-shaped tubular arms or frame members 22 which project forwardly and are welded to the frame members 14 and to a horizontal cross tubular frame 24 (FIG. 3). The forwardly projecting frame members 22 support a pair of front caster wheels 28 each supported for free rotation on a horizontal axis by an inverted U-shaped yoke member 31. Each of the yoke members 31 is supported for free rotation on a vertical axis by a bearing enclosed within a tubular housing 32 welded to the forward end of the corresponding arm or frame member 22.

Referring to FIG. 5, the rear portion of the frame 12 includes a pair of short tubular metal frame members 36 which are welded to the frame members 14 and project laterally outwardly on opposite sides of the platform 18. A metal bracket 38 is welded to each frame member or tube 36 and also to a vertical plate 39 welded to the tubes 14 and 36. Each bracket 38 projects forwardly and upwardly to support a corresponding inclined drive unit 40. Each of the drive units 40 includes a 24 Volt DC electric motor 42 which is close-coupled to and mounted on a gearbox 44 having a right angle and laterally outwardly projecting output shaft 45. The top of the gearbox is secured to the support bracket 38 by a set of screws 47 so that the motor 42 projects forwardly and upwardly, as shown in FIG. 4. One source for the drive units 40 which have provided satisfactory performance is produced by Stature Electric, Inc. in Watertown, N.Y. and referred to as a RAD Series Right-Angle Gearmotor.

Figure 2:
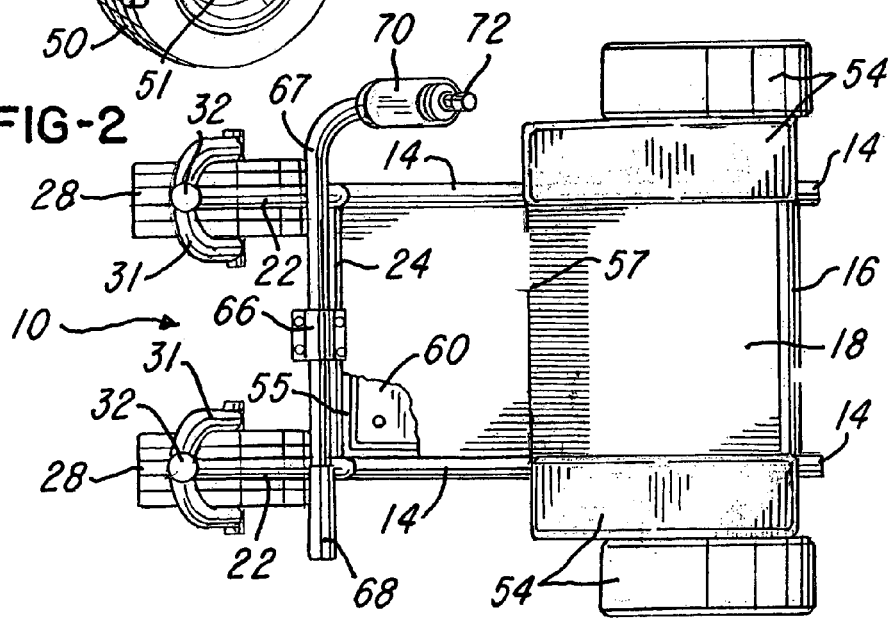
FIG. 2 is a top view of the transporter shown in FIG. 1.

The drive units 40 are produced in right-hand and left-hand models, and the right angle output shafts 45 form the axles on which are mounted a pair of rear wheels 50 secured to the axles by center lug bolts 51. As apparent from FIGS. 3 & 5, the drive units 40 are located between the frame 12 or tubular frame members 14 and the wheels 50 with the right angle shaft on the left-hand unit supporting the left rear wheel 50, and the right angle shaft on the right-hand unit supporting the right rear wheel 50. As shown in FIGS. 1 & 2, each of the rear wheels 50 and the corresponding drive unit 40 is covered by a corresponding one-piece fender guard 54 which is vacuum-formed from a rigid sheet plastics material. Each fender guard 54 is supported by a set of screws (not shown) extending through the guard into the adjacent support plate 37 and also by an upwardly projecting internal metal bracket (not shown) mounted on the outer edge of the support plate or bracket 38.

As shown in FIGS. 1-4, a rectangular battery box 55 having a removable cover or lid 57 are formed by vacuum forming a rigid plastics sheet material, and the box 55 encloses a pair of 12 Volt DC storage batteries 60 which are connected in series to provide an output voltage of 24 Volts DC for use by the motors 42. A vertical tubular metal post 59 has a lower end portion welded to the cross frame tube 24 and telescopically receives a tubular post extension 62. The extension has a set of axially spaced holes 63 for receiving a spring-biased locking cross pin 64 which provides for vertically adjusting the post extension 62 within the tubular post 59. A metal clamp-type fitting 66 is secured to the upper end portion of the post extension 62 and adjustably supports a horizontal tubular metal handlebar 67 with a resilient handlebar grip 68 mounted on one end portion of the handlebar 67. The opposite end portion of the handlebar 67 supports a motor control unit 70 having an upwardly projecting and universally movable joystick 72 which controls the motors 42 for independent operation. The motor control unit 70 and a control system located in the battery box 55 are also produced by Stature Electric, Inc. in Watertown, N.Y. for controlling the drive units 40.

From the drawings and the above description, it is apparent that a motorized personal transporter constructed in accordance with the invention provides desirable features and advantages. More specifically, the low platform 18 provides for a convenient rear entry onto the transporter with only a small step, and the use, location and arrangement of the motor and right angle gearbox drive units 40 between the frame 12 and the rear wheels 50 provides for a compact and simple independent drive for the rear wheels. This arrangement also cooperates with the location of the batteries 60 within the battery box 55 to provide a low profile and low center of gravity. The independent control of the reversible motors 42 from the joystick 72 also provides the transporter with a sharp or tight turning radius so that the transporter may be essentially turned or rotated on a vertical axis. If desired, the post 59 may be substantially shortened and the post extension 62 lengthened in order to provide the transporter with an overall low profile after the extension 62 has been removed. The transporter may then be conveniently transported in a small space such as a the trunk or bed compartment of a motor vehicle. The front caster wheels 28 and driven rear wheels 50 also cooperate with the low center of gravity to prevent the transporter from turning over while it is being driven.

While the form of transporter herein described constitutes a preferred embodiment of the invention, it is to be understood that the invention is not limited to this precise form of transporter, and that changes may be made therein without departing from the scope and spirit of the invention as defined in the appended claims.

What is claimed is:

1. A motorized personal transporter adapted to transport an operator in a standing position, comprising
   a metal frame including parallel spaced tubular horizontal frame members having rear portions rigidly connected by a horizontal rear cross frame member,
   a platform extending between said rear portions of said horizontal frame members and positioned to receive the feet of a standing operator,
   said frame further including a pair of parallel spaced and inverted L-shaped tubular frame members projecting upwardly and forwardly from forward end portions of said tubular horizontal frame members,
   said inverted L-shape frame members having forward end portions supported by a pair of front wheel supports each including a caster wheel mounted for free rotation on a horizontal axis and with each of said wheel supports mounted for swiveling on a vertical axis,
   a pair of rear wheel supports secured to said rear portions of said horizontal frame members and positioned on opposite sides of said platform and laterally outwardly from said rear portions of said frame members,
   said pair of rear wheel supports supporting a pair of drive units positioned between said rear portions of said horizontal frame members and a pair of rear wheels,
   each of said drive units including a reversible electric motor coupled to a gear box having a laterally outwardly projecting output shaft forming an axle connected to one of said rear wheels for independently driving said rear wheels,
   each said electric motor of each of said drive units projecting upwardly and forwardly from the corresponding said gear box,
   an electric storage battery enclosed within a battery box supported by said forward end portions of said horizontal frame members between said platform and said inverted L-shape frame members and electrically connected to operate said drive units,
   a handlebar adjustably mounted on a support post rigidly secured to a front cross frame member of said frame with said support post projecting upwardly from said cross frame member in front of said battery box, and
   a hand control unit mounted on said handle bar and electrically connected to said battery and each said electric motor to control independently the operation of each said motor of said drive units.

2. A transporter as defined in claim 1 and including a pair of one-piece cover members of plastics material and extending over said rear wheels and continuing over the corresponding said drive units.

* * * * *